US008600892B2

(12) United States Patent
Foster et al.

(10) Patent No.: US 8,600,892 B2
(45) Date of Patent: Dec. 3, 2013

(54) RAPID ONLINE PAYMENT SYSTEM

(75) Inventors: James Eugene Foster, Gilroy, CA (US); Chad Maurice Hoffman, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 1 day.

(21) Appl. No.: 13/338,019

(22) Filed: Dec. 27, 2011

(65) Prior Publication Data

US 2012/0173426 A1 Jul. 5, 2012

Related U.S. Application Data

(60) Provisional application No. 61/430,074, filed on Jan. 5, 2011.

(51) Int. Cl.
*G06Q 40/00* (2012.01)

(52) U.S. Cl.
USPC .............................................. 705/44; 705/35

(58) Field of Classification Search
USPC ....................................................... 705/44, 35
See application file for complete search history.

(56) References Cited

U.S. PATENT DOCUMENTS

2007/0288392 A1\* 12/2007 Peng et al. ....................... 705/72
2008/0126251 A1\* 5/2008 Wassingbo ...................... 705/44
2010/0161434 A1\* 6/2010 Herwig et al. .................. 705/20
2012/0095853 A1\* 4/2012 von Bose et al. ............... 705/16

OTHER PUBLICATIONS

Business_wire; "Online Payment System in China—The New Market for High Competition in the E-Commerce Industry"; Jan 19, 2006.\*
O'Shea, Dan; "Payments Security Concerns Grow as Mobile Sees Gains"; Cardline; Apr. 1, 2011.\*

\* cited by examiner

*Primary Examiner* — Edward Chang
(74) *Attorney, Agent, or Firm* — Haynes and Boone, LLP

(57) ABSTRACT

A method for online payments includes receiving an instruction to start a payment application. Payment tag information is then received and sent over a network. Product information that is associated with the payment tag information is then received over the network and displayed on a first payment page that includes a request for payment account credentials. The first payment page is provided through the payment application immediately following the sending of the payment tag information. Payer account credentials are then received through the payment application and sent over the network. Payer account information is then received over the network and displayed on a second payment page that includes a payment confirmation indicator. The second payment page is provided through the payment application immediately following the first payment page. A selection of the payment confirmation indicator is then received through the payment application and sent over the network.

20 Claims, 17 Drawing Sheets

RAPID ONLINE PAYMENT SYSTEM

CROSS REFERENCE TO RELATED APPLICATION

This patent application claims priority to U.S. Provisional Patent Appl. Ser. No. 61/430,074, filed Jan. 5, 2011, which is incorporated by reference herein in its entirety.

BACKGROUND

1. Field of the Invention

The present invention generally relates to online and/or mobile payments and more particularly to a rapid online payment system.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

Thus, the use of mobile devices such as a smart phones allow consumers to shop and make payments from virtually anywhere. However, conventional mobile shopping situations still require the consumer to perform web-based transaction flows that are designed for a non-mobile system and that are cumbersome and time-consuming on a mobile device for a number of reasons. For example, the display of a mobile device is typically smaller than the display of a non-mobile device for which the web-based transaction flow is typically designed, which may result in difficulties with regard to reading information from and entering information on the mobile device. In another example, mobile device keypads or keyboards present a variety of difficulties with regard to their use relative to a standard keyboard on a non-mobile device, which can result in a higher likelihood of entering erroneous data.

Such problems associated with making purchases using a mobile device may result in a consumer deciding to delay the purchase (e.g., until the consumer can make the purchase on a non-mobile device) or even forego the purchase completely.

Furthermore, consumers may encounter products in non-electronic or web-based forms such as, for example, physical advertisements (e.g., consumers may encounter a product that they wish to purchase but did not initially seek out, i.e., "impulse" purchases). This may occur at any time, e.g., when the consumer is traveling, waiting in line, sitting on a bus, watching the television, etc. Conventional mobile purchasing systems require the consumer to determine how to find and purchase the product using the advertisement. For example, the consumer may be required to use their mobile device to search for the product, go to a website listed on the advertisement, and/or otherwise "find" the product using their mobile device. The consumer is then required to locate a product purchasing page using their mobile device (which presents many of the problems discussed above with regard to the use of mobile devices), followed by the consumer being presented with the conventional web-based purchases flow issues discussed above. It has been found that such conventional mobile purchasing systems, and the issues they entail with regard to mobile devices, are so time consuming that the consumer typically decides not to go through with the purchase.

Thus, there is a need for an improved online payment system.

SUMMARY

According to one embodiment, a method for online payments includes starting a payment application on a payer device. The payment application, upon start-up, may immediately provides the user with a payment tag information provision page. The user may use the payment tag information provision page to capture an image of a payment tag. The payment tag has been provided to a seller to be attached to a product and/or product advertisement, and the payment tag includes payment tag information that is associated in a product/tag database with product information for the product. The image captured of the payment tag provides payment tag information that the payment application may automatically send over the network to a product retrieval engine that uses it to retrieve the product information that is associated with the payment tag information in the product/tag database. The product information is then sent over the network to the payment application. The payment application may then provide the user with a first payment page that may immediately follows the payment tag information provision page and that includes the product information and a request for payer account credentials. The user then provides payer account credentials to the payment application, and the payment application sends the payer account credentials over the network to a payer account engine that uses the payer account information to verify that the user has a payer account. The payer account engine then sends payer account information over the network to the payment application, and the payment application provides the user with the second payment page that may immediately follows the first payment page and includes the payer account information and a payment confirmation indicator. The user may then select the payment confirmation indicator and the payment application will send a payment confirmation over the network to the payer account engine. The payer account engine may then cause funds to be transferred from the payer account to a seller account of the seller.

As a result, a user may purchase a product simply by seeing a payment tag on a product or product advertisement, starting a payment application, capturing an image of the payment tag using the payment application, providing payer account credentials through the payment application, and selecting a payment confirmation indicator on the payment application. The combination of the payment tag and the payment application reduces the time and complexity in making a mobile purchase using the payer device from several minutes to, in many cases, substantially under one minute, which results in the user being more likely to purchase the product.

These and other features and advantages of the present disclosure will be more readily apparent from the detailed description of the embodiments set forth below taken in conjunction with the accompanying figures.

BRIEF DESCRIPTION OF THE FIGURES

FIG. 10b is a screenshot illustrating an embodiment of a first payment page provided in response to selecting the payment tag of FIG. 10a;

Figure 1:
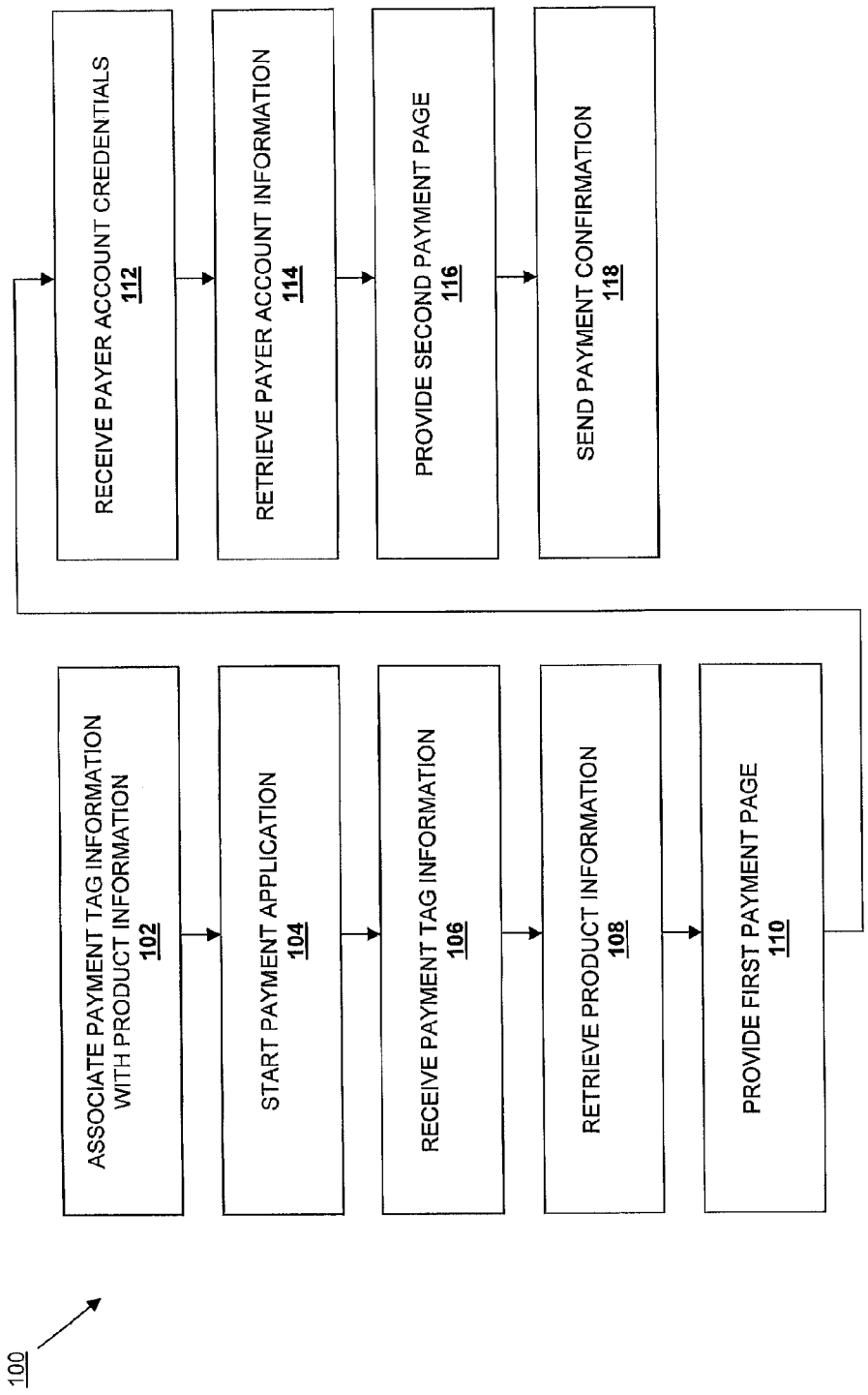
FIG. 1 is a flow chart illustrating an embodiment of a method for online payments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for making online payments. A seller includes a plurality of products and/or product advertisements. For each product, product information for that product may be associated with product tag information in a product/tag database, and product tags may be provided by the seller with their associated products and/or product advertisements (e.g., at a seller location, at an advertising location, etc.) A payer includes a payer device having a payment application. Upon start up of the payment application, the user is presented a payment tag information provision screen that allows the payer to use a camera on the payer device to capture an image of the payment tag that is provided with the product or product advertisement. The image of the payment tag provides payment tag information that the payment application may automatically send over a network to a product retrieval engine such that product information associated with the payment tag information may be retrieved and returned, over the network, to the payment application. The payment application may then present the user with a first payment page that immediately follows the payment tag information provision page and includes the product information and a request for payer account credentials. The user may then provide the payer account credentials to the payment application for forwarding to a payer account engine. The payer account engine then verifies a payer account using the payer account credentials and sends payer account information (e.g., a purchase funding account, a shipping address, etc.) over the network to the payment application. The payment application may then present the user with the second payment page that immediately follows the first payment page and includes the payer account information and a payment confirmation indicator. Selection of the payment confirmation indicator by the user causes the payment application to send a payment confirmation to the payer account engine, which then causes funds to be sent from the purchase funding account of the payer to an account of the seller.

Figure 2:
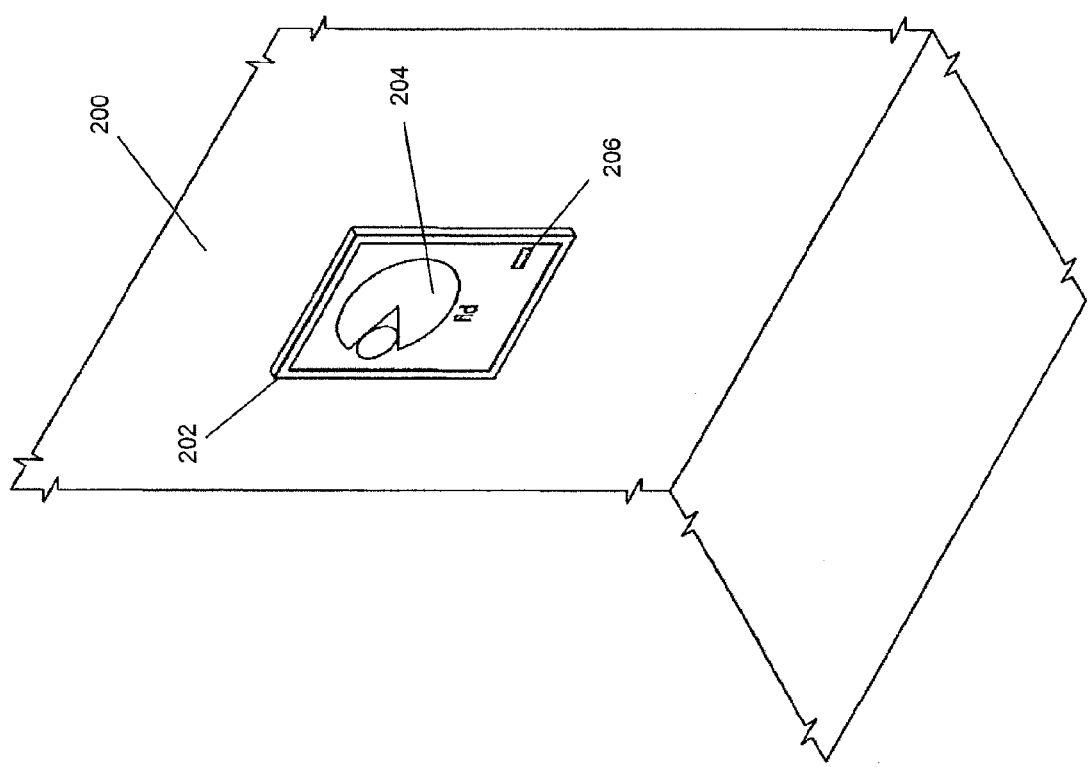
FIG. 2 is a perspective view illustrating an embodiment of a product advertisement.

Referring now to FIGS. 1 and 2, a method 100 for online payments begins at block 102 where payment tag information is associated with product information. In an embodiment, the online payment system includes one or more product/tag databases in which each product in the online payment system includes product information that is associated with distinct payment tag information. For example, a seller of a plurality of products such as, for example, athletic shoes, may provide product information (e.g., shoe type, shoe style, shoe brand, shoe price, available shoe sizes, etc.) in the product/tag databases for each of the products in the product/tag databases, and then may associate distinct payment tag information such as, for example, a distinct alphanumeric character string and/or other identifier known in the art, with each set of product information in the database. In another example, an online payment system provider may accept product information for products from a plurality of different sellers and associate the product information for each product with distinct payment tag information in the product/tag databases. In this example, the product information may include additional information that is not directly related to the product such as, for example, seller information about the seller. Thus, the online payment system may be seller-specific in that only a single seller's products are available for purchase using payment tags, or it may provide products from a variety of different sellers who 'register' their products with an online payment system provider that then provides each seller with a payment tag for each of their products. In embodiments where a variety of different sellers provide products in the online payment system, the distinct payment tag information for each distinct payment tag is therefore associated with a product and the seller of that product. While a few examples have been provided, one of skill in the art will recognize that payment tag information may be associated with product information in a variety of other scenarios while remaining within the scope of the present disclosure.

In an embodiment, product information may include a number of categories such as, for example, product data, product inventory information, product shipping information, and/or a variety of other product information known in the art. The seller or online payment system provider may enter the product data into a product/tag database (e.g., using a web interface, through an Application Programming Interface (API), and/or using a variety of other methods known in the art.) The seller or online payment system provider may also enter the product inventory information into the product/tag database in the same manner, and the online payment system may update the product inventory information as that information changes (e.g., when purchases of the product associated with the product inventory information are made). In other embodiments, the inventory status of a product may be updated in real time via API calls to the seller. The seller or online payment service provider may input the product shipping information into the product/tag database, and that product shipping information may be determined by the seller or online payment service provider and based on payer location. Any purchases of products may be reported from the online payment system provider to the seller through an Instant Payment Notification (IPN) system such as, for example, IPN systems provided by PayPal, Inc. of San Jose, Ca., that make IPN's available daily, upon a change/purchase in the product information, periodically, and/or at other intervals known in the art.

As discussed above, payment tag information may include an alphanumeric character string and/or other identifier known in the art. The payment tag information may be used to create a payment tag that includes the payment tag information. For example, the payment tag information may be used to create a payment tag that may include, for example, a Universal Product Code (UPC), an International Article Number (EAN), a Quick Response (QR) code, a web page based selector button, and/or a variety of other identifiers known in the art. The payment tag may be included on a physical medium such as, for example, a sticker, that may be attached to its associated product. The payment tag may also be included in a product advertisement for its associated product. For example, FIG. 2 illustrates a wall 200 including a product advertisement 202 having advertising materials 204 and a product tag 206. While a few examples of product tags are provided below, one of skill in the art will recognize that a variety of different product tags will fall within the scope of the present disclosure.

Figure 3:
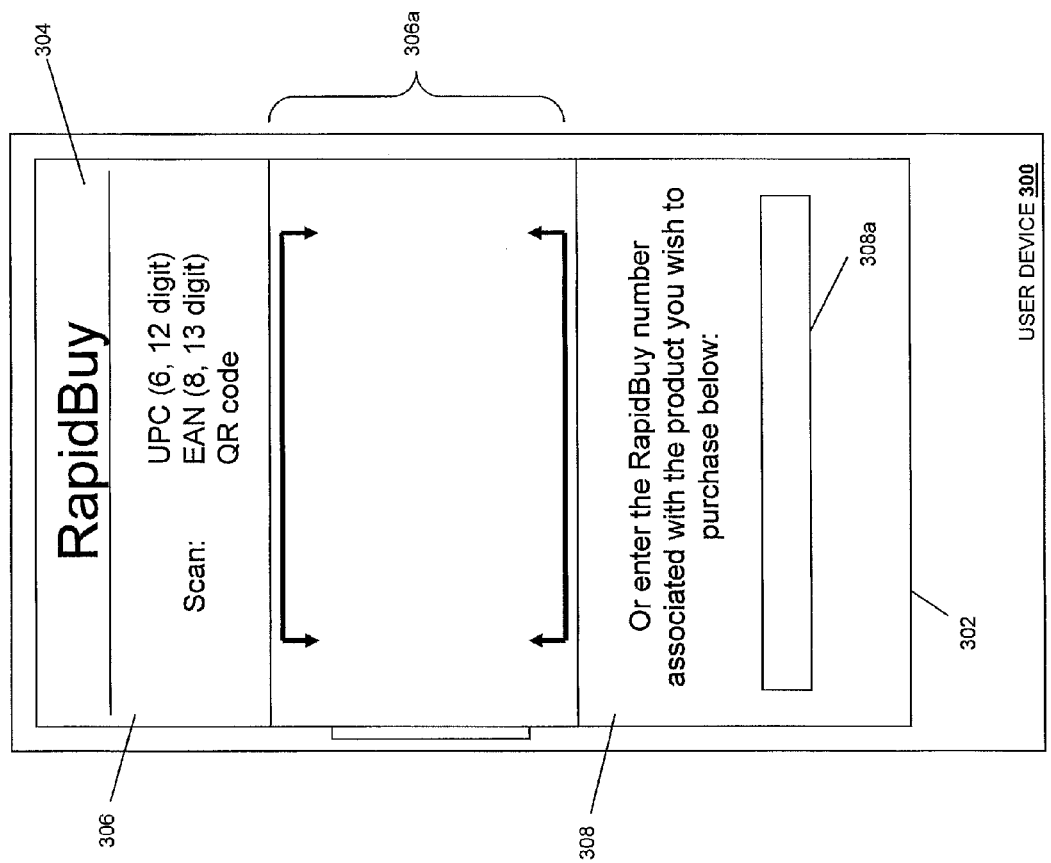
FIG. 3 is a screenshot illustrating an embodiment of a payment tag information provision page.

Referring now to FIGS. 1, 2, and 3, the method 100 then proceeds to block 104 where a payment application is started. In the embodiment discussed below, a payer having a mobile payer device such as, for example, a phone, encounters the product advertisement 202 of FIG. 2 and decides to purchase the product associated with the product advertisement 202. However, this embodiment is presented only as an example, and one of skill in the art will recognize that variety of other purchasing scenarios will fall within the scope of the present disclosure. At block 104, upon deciding to purchase the product in the product advertisement 202, the payer may use their payer device to start a payer application that is included on the payer device. In an embodiment, the payer application includes instructions that are stored on a non-transitory, computer-readable medium that, when executed by a processor in the payer device, cause the processor to perform the functions of the payment application discussed below. The payment application may be provided by the operator of the online payment system (e.g., a seller that operates the online payment system, an online payment system provider that operates the online payment system for a plurality of sellers, a funding account provider that operates the online payment system, etc.)

As described below, the payer application provides a payment flow using the payment tags that allows rapid mobile payments online using the mobile payer device. Upon receiving the instruction to start the payment application, the payer device activates the payment application. Activation of the payment application provides a payment tag information provision page through the payment application on the payer device. FIG. 3 illustrates a payer device 300 that includes a display 302 displaying a payment tag information provision page 304. In an embodiment, the payment tag information provision page 304 is provided through the payment application on the payer device 300 immediately after the instruction to start the payment application is received by the payer device 300.

For example, following the provision of the instruction to start the payment application, the payment tag information provision page 304 may be the first user-interactive page provided to the user through the payment application on the payment device 300. As is known in the art, loading pages and/or other non-interactive pages may be provided on the payer device 300 as the payment application is loaded and/or otherwise started up, but the payment tag information provision page 304 may be the first page provided to the user on the payment application with which the user interacts with to start the payment process. In another example, following the provision of the instruction to start the payment application, the payment tag information provision page 304 may be the first substantive user-interactive page provided to the user through the payment application on the payment device 300. As is known in the art, a landing page for the payment application may be provided on the payer device 300 in response to start up of the payment application, and the landing page may include a selector buttons for making a rapid mobile payment, adjusting the settings of the payment application, and/or a variety of other selector buttons known in the art. In such a situation, the payment tag information provision page 304 may be considered the first substantive page provided to the user on the payment application with which the user interacts with to start the payment process, as the selector button for making a rapid mobile payment adds relatively little time to the payment process. Thus, while immediately presenting the payment tag information provision page 304 to the user through the payment application following the instruction to start the payment application shortens the payment process, providing a landing page that includes a selector button for making a rapid payment, which results in the payment tag information provision page 304 being quickly provided through the payment application, that does not significantly lengthen the payment process will fall within the scope of the present disclosure.

The payment tag information provision page 304 includes a first payment tag information acquisition section 306 and a second payment tag information acquisition section 308. In the illustrated embodiment, the first payment tag information acquisition section 306 provides for the 'scanning', 'visual', or 'image' acquisition of payment tag information, while the second payment tag information acquisition section 308 provides for the 'manual', 'text', or otherwise more user intensive acquisition of payment tag information, as discussed in further detail below. The first payment tag information acquisition section 306 includes an image capture window 306a, and the second payment tag information acquisition section 308 includes a text input 308a. As can be seen, the first payment tag information acquisition section 306 and the second payment tag information acquisition section 308 provide a request by the payment application for payment tag information from the user.

Figure 4:
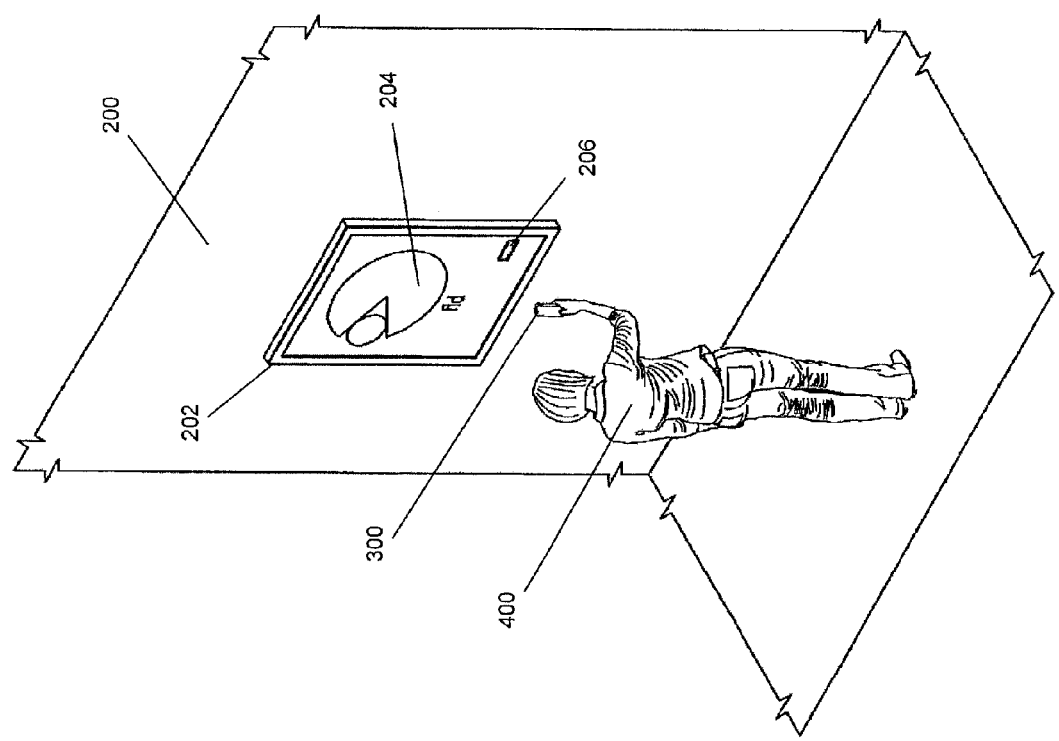
FIG. 4 is a perspective view illustrating an embodiment of a user capturing an image of a payment tag on the product advertisement of FIG. 2.

Referring now to FIGS. 1, 3, and 4, the method proceeds to block 106 where payment tag information is received. FIG. 4 illustrates a user 400 using the payer device 300 to provide payment tag information from the payment tag 206 to the payment application. As can be seen in FIG. 4, in response to seeing the product advertisement 202 and deciding the buy the product associated with the product advertisement 202, the user 400 has started the payment application on the payer device 300 and is using the payment tag information provision page 304 on the payer device 300 to provide payment tag information to the payment application.

Figure 5:
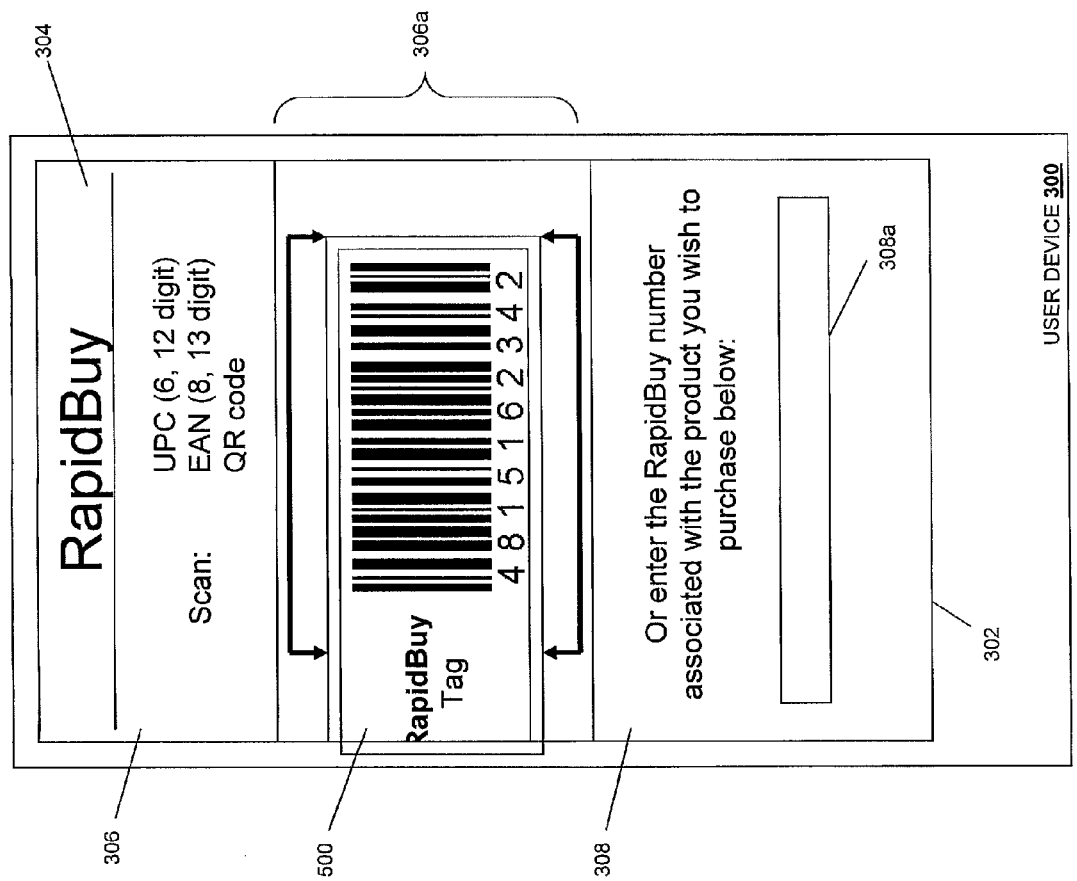
FIG. 5 is a screenshot illustrating an embodiment of the payment tag of FIG. 4 being captured using the payment tag information provision page of FIG. 3.
Figure 6:
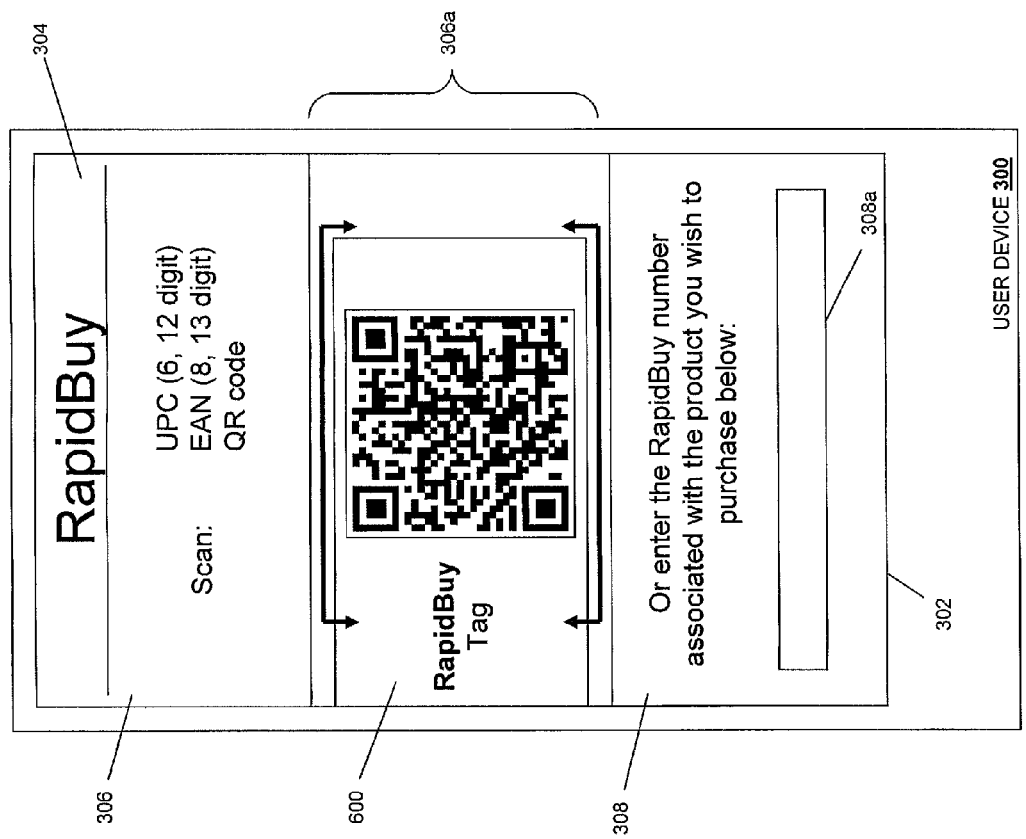
FIG. 6 is a screenshot illustrating an embodiment of the payment tag of FIG. 4 being captured using the payment tag information provision page of FIG. 3.

In the embodiment illustrated in FIG. 5, a payment tag 500, which may be the payment tag 206 illustrated in FIG. 2, includes a UPC. The payer device 300 may include a camera that is operable to capture an image of the payment tag 500 and, using methods known in the art, the payment application may use the image to determine the payment tag information included in the payment tag 500 (e.g., the information encoded in the UPC). In another example, the payer device 300 may include a scanning device that is operable to provide a light source on the payment tag 500 and measure the intensity of the light reflected back, and the payment application may use the measured light intensities to determine the payment tag information included in the payment tag 500 using methods known in the art. In another embodiment, the payment tag may include human-readable payment tag information (e.g., "4815162342" on the payment tag 500 in the illustrated embodiment), that the payer 400 may enter into the text input 308a in the second payment tag information acquisition section 308, and the payment application may determine that the text string as the payment tag information. In the embodiment illustrated in FIG. 6, a payment tag 600, which may be the payment tag 206 illustrated in FIG. 2, includes a QR code. The payer device 300 may include a camera that is operable to capture an image of the payment tag 600 and, using methods known in the art, the payment application may use the image to determine the payment tag information included in the payment tag 600 (e.g., the information encoded in the QR code).

The method 100 then proceeds to block 108 where product information is retrieved. Upon receiving the payment tag information in block 106 of the method 100, the payment application sends the payment tag information over a network to a product retrieval engine provided by an operater of the online payment system. In an embodiment, the payment application may be operable to automatically send the payment tag information to the product retrieval engine upon determining the payment tag information from the image captured by the user. Thus, in one example, the user starts the payment application, is presented with the payment tag information provision page 304, frames the payment tag in the image capture window 306a, and payment tag information is then automatically sent to the product retrieval engine. The product retrieval engine then accesses the product/tag databases and uses that payment tag information to determine the product information that is associated with that payment tag information. The product retrieval engine then sends that product information over the network to the payment application on the payer device 300 such that the payment application has retrieved the product information using the payment tag information received in block 106.

Figure 7:
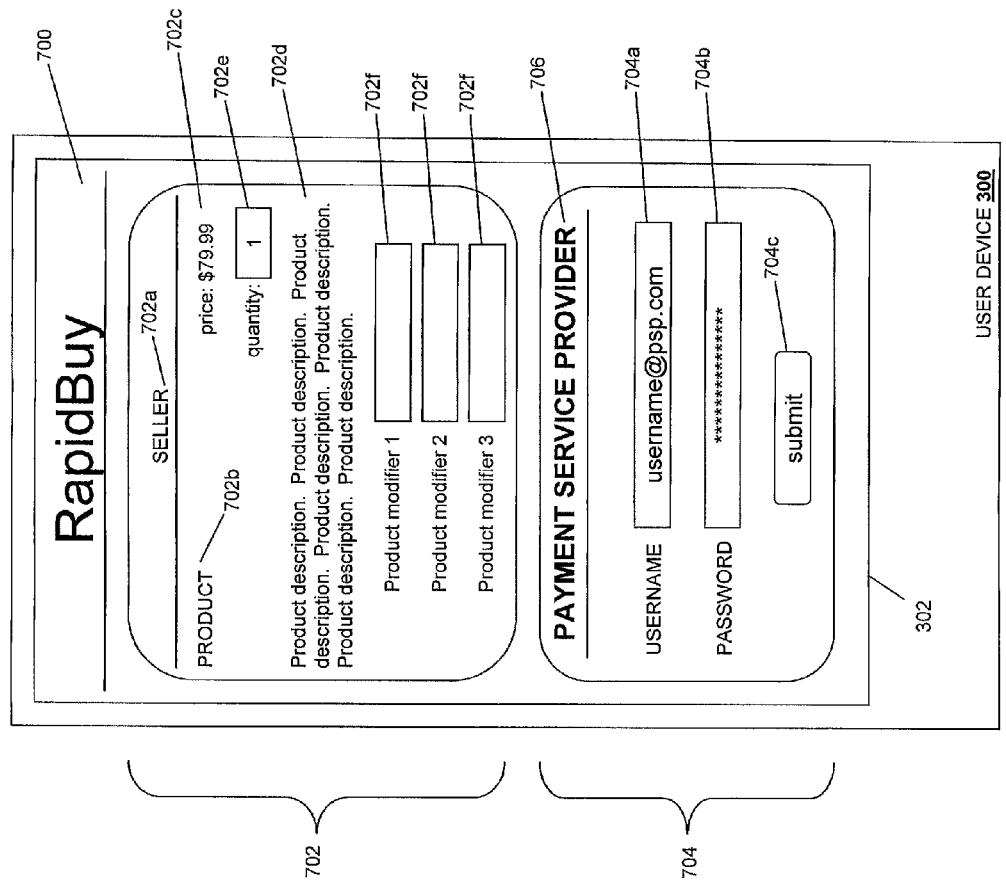
FIG. 7 is a screenshot illustrating an embodiment of a first payment page.

Referring now to FIGS. 1 and 7, the method 100 proceeds to block 110 where a first payment page is provided. In the illustrated embodiment, the payment application has provided a first payment page 700 including a product section 702 and a payer account credential request section 704. However, in some embodiments, the product section 702 may be omitted. The product section 702 may include some or all of the product information retrieved in block 108 such as, for example, seller information 702a, a product name 702b, a product price 702c, and a product description 702d. While a plurality of examples of product information are provided in the illustrated embodiment, one of skill in the art will recognize that a variety of different product information (e.g., shipping information such as shipping cost, shipping times, etc.) will fall within the scope of the present disclosure.

In the illustrated embodiment, the product section 702 also includes a plurality of product modifier inputs (which may also be considered product information) such as, for example, a quantity input 702e and product modifier inputs 702f. The user of the payment application may use the payer device 300 to provide a number (e.g., "1" in the illustrated embodiment) of the products that the user wishes to purchase in the quantity input 702e. The user of the payment application may also use the payer device 300 to provide product modifiers for the product they wish to purchase in the product modifiers 702f. In an embodiment, the seller of the product may provide the product modifier inputs 702f as part of the product information, and they may allow the user to select between a number of modifiers for the product. For example, if the product is an article of clothing, the user may be able to use the product modifiers 702f to provide product modifiers such as size, color, and/or a variety of other product modifiers known in the art.

The payer account credential request section 704 includes a user name input 704a, a password input 704b, and a submit button 704c. The user of the payment application may use the payer device 300 to provide a user name in the user name input 704a and a password in the password input 704b. In the illustrated embodiment, the user name and password correspond to payer account credentials for a payer account provided by a payment service provider 706. For example, a payment service provider such as PayPal, Inc. of San Jose, Calif. may provide payment services to the user by providing the user a payer account. The user may then associate funding accounts such as, for example, a checking account, a savings account, a credit account, and/or a variety of other funding accounts known in the art, with that payer account. The user may then make purchases using the payer account, and the payment service provider will transfer funds from the appropriate funding account in order to pay for the purchase. In other embodiments, the user name and password may correspond to payer account credentials for a payer account provided by a seller, a funding account provider, and/or a variety of other payer account providers known in the art. For example, the seller may provide the user a credit account for making purchases with the seller, and the user name and password correspond to payer account credentials for that credit account. In another example, a funding account provider may provide the user a funding account (e.g., a checking account, a savings account, a credit account, etc.), and the user name and password correspond to payer account credentials for that funding account. In such an example, the payer account credential request section 704 may include an input that allows the user to indicate the funding account provider that provides the funding account.

Upon provision of a user name in the user name input 704a and a password in the password input 704b, the user may select the submit button 704c, and the method 100 proceeds to block 112 where payer account credentials are received. Selection of the submit button 704c provides the payment account credentials to the payment application. In an embodiment, user name input 704a and/or the password input 704b may be auto-filled in the payment application. In such an embodiment, if no product modifier inputs are provided in the product section 702, or if the product modifiers 702f are already correctly filled (e.g., the payment application and/or the payer device 300 may save user preferences such as clothing sizes and color preferences and autofill the product modifiers 702f), the user simply needs to select the submit button 704c when presented with the first payment page 700. Thus, in one embodiment, upon seeing the product advertisement 202, the user has started the payment application, captured an image of the payment tag to cause payment tag information to automatically be sent such that product information was retrieved, and then selected a submit button to provide payer account credentials to the payment application.

The method 100 then proceeds to block 114 where payer account information is retrieved. Upon receiving the payer account credentials in block 114 of the method 100, the payment application sends the payer account credentials over the network to a payer account engine that may use the payment account credentials to determine a payer account of the payer that may be used to purchase the product. For example, in an embodiment in which the payer account is provided by a payment service provider, the payer account engine may be operated by the payment service provider and is operable to determine a payer account that the payer has with the payment service provider. In another example, in an embodiment in which the payer account is provided by the seller of the product, the payer account engine may be operated by the seller and is operable to determine a payer account that the payer has with the seller. In another example, in an embodiment in which the payer account is provided by a funding account holder, the payer account engine may be operated by the funding account holder and is operable to determine a payer account that the payer has with the funding account holder. In another example, the payer account engine may be operated by the online payment system provider and is operable to receive the payer account credentials, provide the payer account credentials to a payer account holder for the payer, and receive a confirmation from the payer account holder that the payer has a payer account.

In response to determining that the payer account credentials correspond to a payer account for the payer, the payer account engine retrieves payer account information and sends the payer account information over the network to the payment application. In an embodiment, the payer account information may include a payer name, a payer account number, a list of funding accounts associated with the payer account, one or more shipping addresses provided for the payer account, and/or a variety of other payer account information known in the art.

Figure 8:
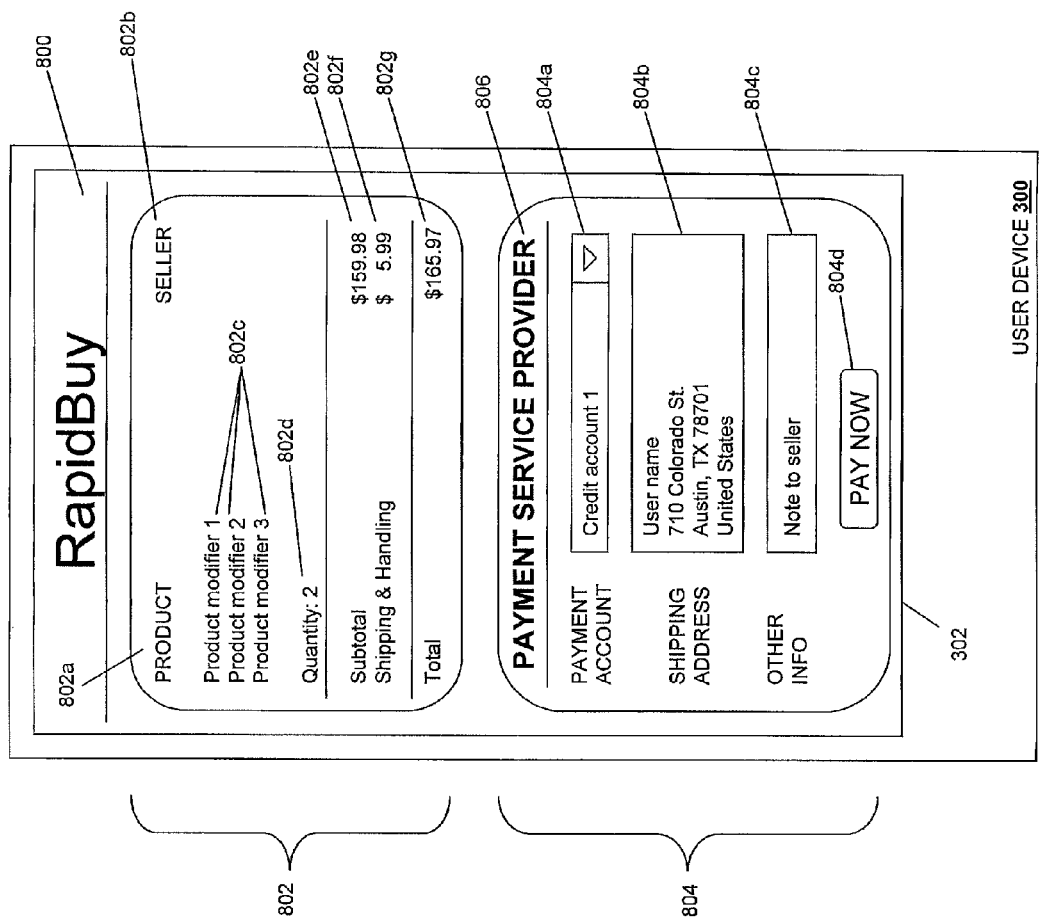
FIG. 8 is a screenshot illustrating an embodiment of a second payment page.

Referring now to FIGS. 1 and 8, the method 100 then proceeds to block 116 where a second payment page is provided. In the illustrated embodiment, the payment application has provided a second payment page 800 including a product section 802 and a payer account section 804. The product section 802 may include some or all of the product information retrieved in block 108 such as, for example, seller information 802a and a product name 802b. The product section 802 may also include information provided in the product modifier inputs 702e and 702f on the first payment page 700, such as a plurality of product modifiers 802c and a quantity 802d. That product section 802 may also include a plurality of pricing information such as, for example, a subtotal amount 802e, a shipping & handling amount 802f, and a total amount 802g. In an embodiment, the subtotal amount 802e may be computed by the payment application using the product price 702c and quantity input 702e on the first payment page 700. Furthermore, the shipping & handling amount 802f may be determined by the payment application using product information and a shipping address included in the payer account information retrieved in block 114. Finally, the total amount 802g may be computed by the payment application using the subtotal amount 802e and the shipping & handling amount 802f. While a plurality of examples of product information are provided in the illustrated embodiment, one of skill in the art will recognize that a variety of different product information will fall within the scope of the present disclosure.

In the illustrated embodiment, the payer account section 804 includes a funding account selector 804a. For example, in the illustrated embodiment, the payer account information retrieved in block 114 is for a payer account provided by a payment service provider 806, and the payer account information includes a plurality of funding account that are associated with the payer account. The funding account selector 804a allows the user to select which funding account to use in funding the purchase. In other embodiments, multiple funding accounts may not be associated with the payer account (e.g., when only one funding account is associated with the payer account provided by the payment service provider, when the seller provides a single payer account to the payer, when a funding account provider provides a single payer account to the payer, etc.), and the funding account selector may be omitted.

The payer account section 804 also includes a shipping address section 804b. In an embodiment, the shipping account section 804b may be autofilled with shipping information that was retrieved as part of the payer account information in block 114. Furthermore, several shipping addresses may have been retrieved as part of the payer account information, and the shipping account section 804b may allow the user to quickly select between those shipping addresses. Furthermore, the shipping address section 804b may allow the user to provide a new shipping address that was not part of the payer account information retrieved in block 114. In the illustrated embodiment, the product account section 804 also includes a note to seller input 804c that allows the user to provide a note to the seller of the product being purchased. However, in other embodiments, the note to seller input 804c may be omitted. The product account section 804 also includes a payment confirmation indicator 804d.

The method 100 then proceeds to block 118 where a payment confirmation is sent. The user may use the payer account section 804 on the second payment page 800 to select a funding account (e.g., using the funding account selector 804a), verify, change, or provide a shipping address (e.g., using the shipping address section 804b), and optionally provide a note to the seller (e.g., using the note to seller input 804c). If the payer is satisfied that the information in the product section 802 and the payer account section 804 is accurate, the payer may select the payment confirmation indicator 804d. In response to detecting the selecting the payment confirmation indicator 804d, the payment application sends a payment confirmation over the network to online payment system provider. In an embodiment, the payment confirmation may be sent to the online payment system provider and then forwarded to the seller, a payment service provider, a funding account provider, and/or a variety of other purchasing entities known in the art. In an embodiment, the payment confirmation may include the information in the product section 802, the information in the payer account section 804, and/or a variety of other purchasing information known in the art. In an embodiment, in response to receiving the payment confirmation, a payment service provider and/or a funding account provider may transfer funds from a funding account of the payer to an account of the seller of the product being purchased. Thus, in one embodiment, upon seeing the product advertisement 202, the user starts the payment application, captures an image of the payment tag to cause payment tag information to automatically be sent such that product information was retrieved, selects a submit button to provide payer account credentials to the payment application, and selects a payment confirmation indicator to confirm the purchase. One of skill in the art will recognize that such an embodiment, and several other embodiments discussed above, greatly reduce the time and complexity of making mobile purchases.

Figure 9:
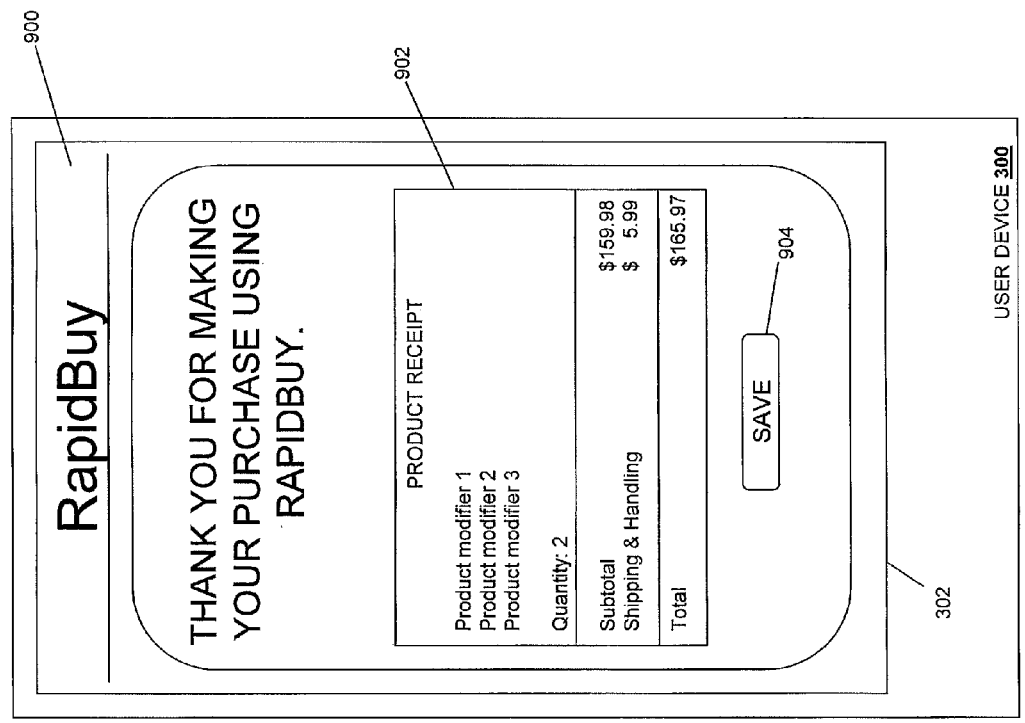
FIG. 9 is a screenshot illustrating an embodiment of a receipt page.

Referring now to FIG. 9, in an embodiment, upon receiving the selection of the payment confirmation indicator 804d, the payment application may provide a receipt page 900 that includes a product receipt 902 and a save button 904 that the user may select in order to save the product receipt 902 on the payer device 300.

Thus, an online payment system method has been described that greatly reduces the time and complexity of making mobile payments by allowing a payer to quickly and easily provide product tag information that may be used to retrieve and provide the user with information about a product they wish to purchase. The system then immediately provides a first payment page that allows the user to quickly and easily provider payer account credentials. The system then immediately provides a second payment page that allows a user to quickly and easily provide a payment confirmation in order to purchase the product. Information such as some or all of the payer account credentials, product quantities, product modifiers, funding accounts, and shipping addresses may be auto filled by the payment application such that the user may complete the purchase flow and purchase the product very quickly (e.g., simply by starting the payment application, capturing an image of the product tag, submitting payer account credentials, and selecting a payment confirmation indicator.) Thus, impulse purchases are enabled through a mobile device, providing benefits to purchases (quicker and easier purchases) and sellers (fewer lost purchases due to complicated purchases flows that are not conducive to a mobile environment.)

Referring now to FIGS. 10a, 10b, 10c, and 10d, an online payment system is illustrated that is similar to the online payment system discussed above, but with the provision that the product tags are electronic and provided on web-based product advertisements. The online payment system illustrated in FIGS. 10a, 10b, 10c, and 10d may operate according to the method 100 discussed above with a few differences detailed below.

Figure 10A:
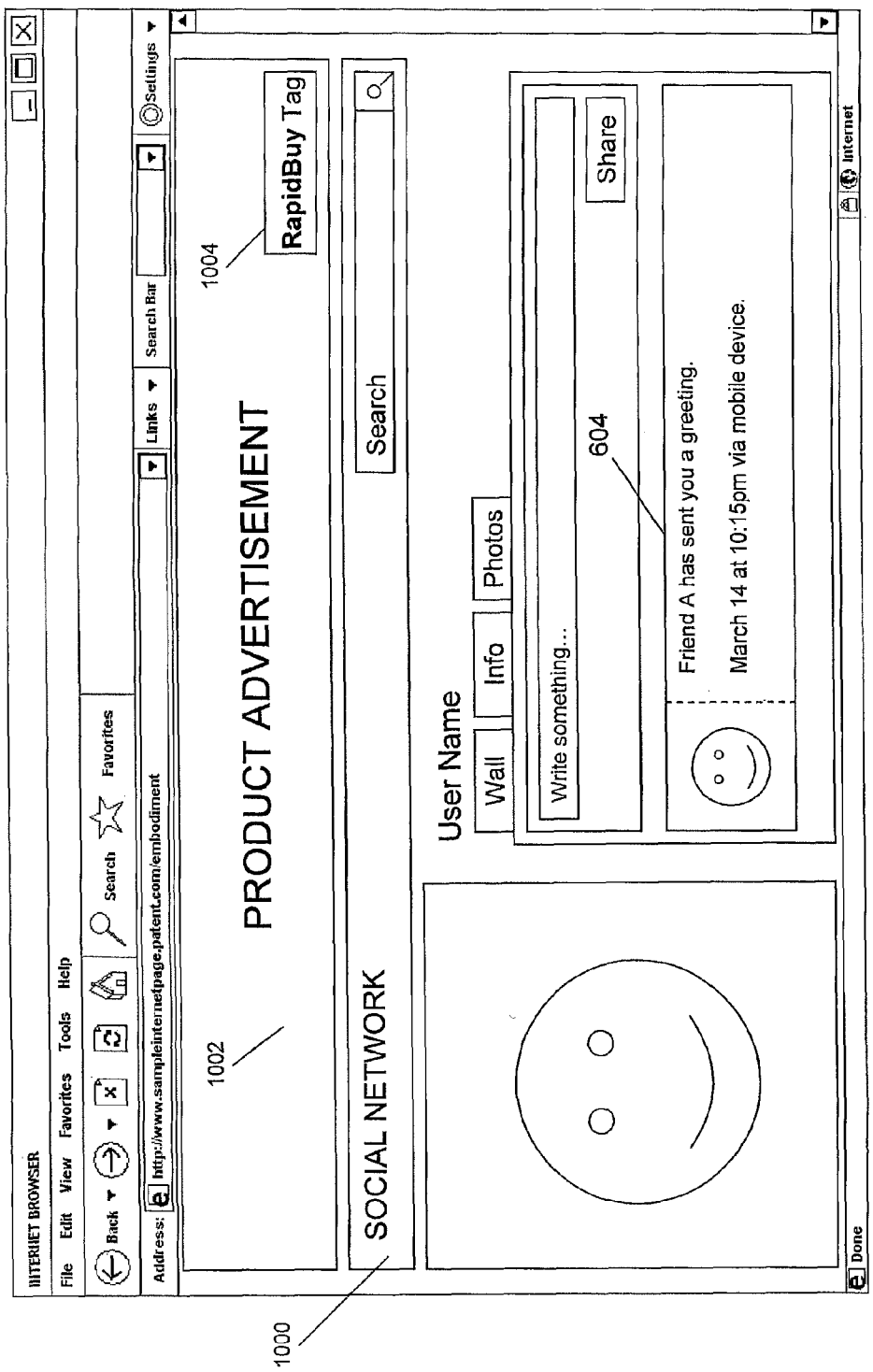
FIG. 10a is a screenshot illustrating an embodiment of a web-based product advertisement including a payment tag.

For example, at block 102 of the method 100, the electronic payment tags, which are associated with payment tag information that is associated with the product information in the product/tag databases, may be provided to sellers. The sellers may then provide the electronic payment tags in electronic product advertisements. For example, FIG. 10a illustrates a web page 1000 displayed in a web browser. While the web browser may be recognized by someone of skill in the art as a desktop web browser, one of skill in the art will understand that mobile web browsers will fall within the scope of the present disclosure as well. The web page 1000 includes a product advertisement 1002, and a payment tag 1004 has been included with the product advertisement 1002. In an embodiment, the electronic payment tag 1004 may include or have access to the payment tag information discussed above.

Figure 10B:
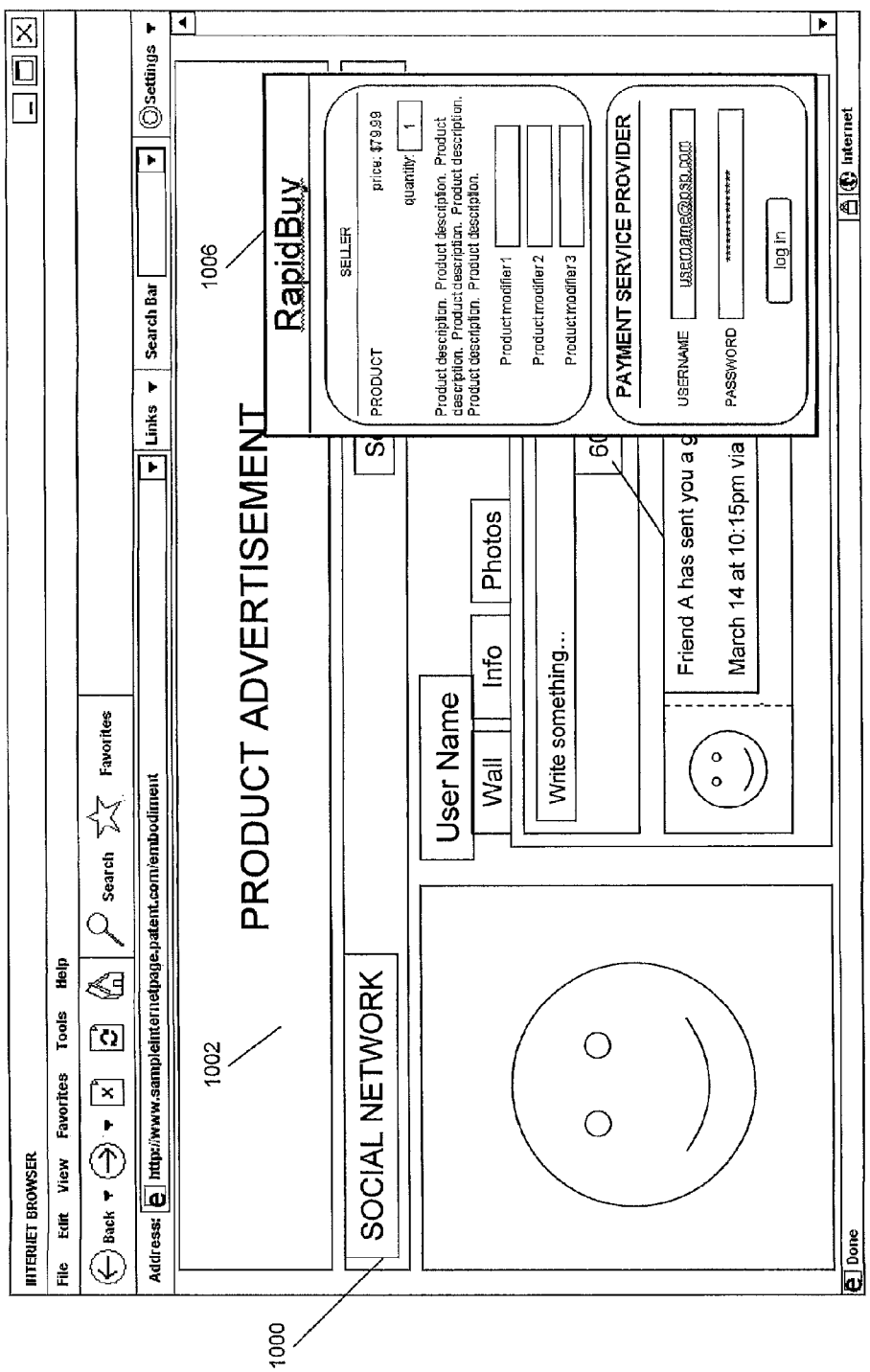
Figure 10C:
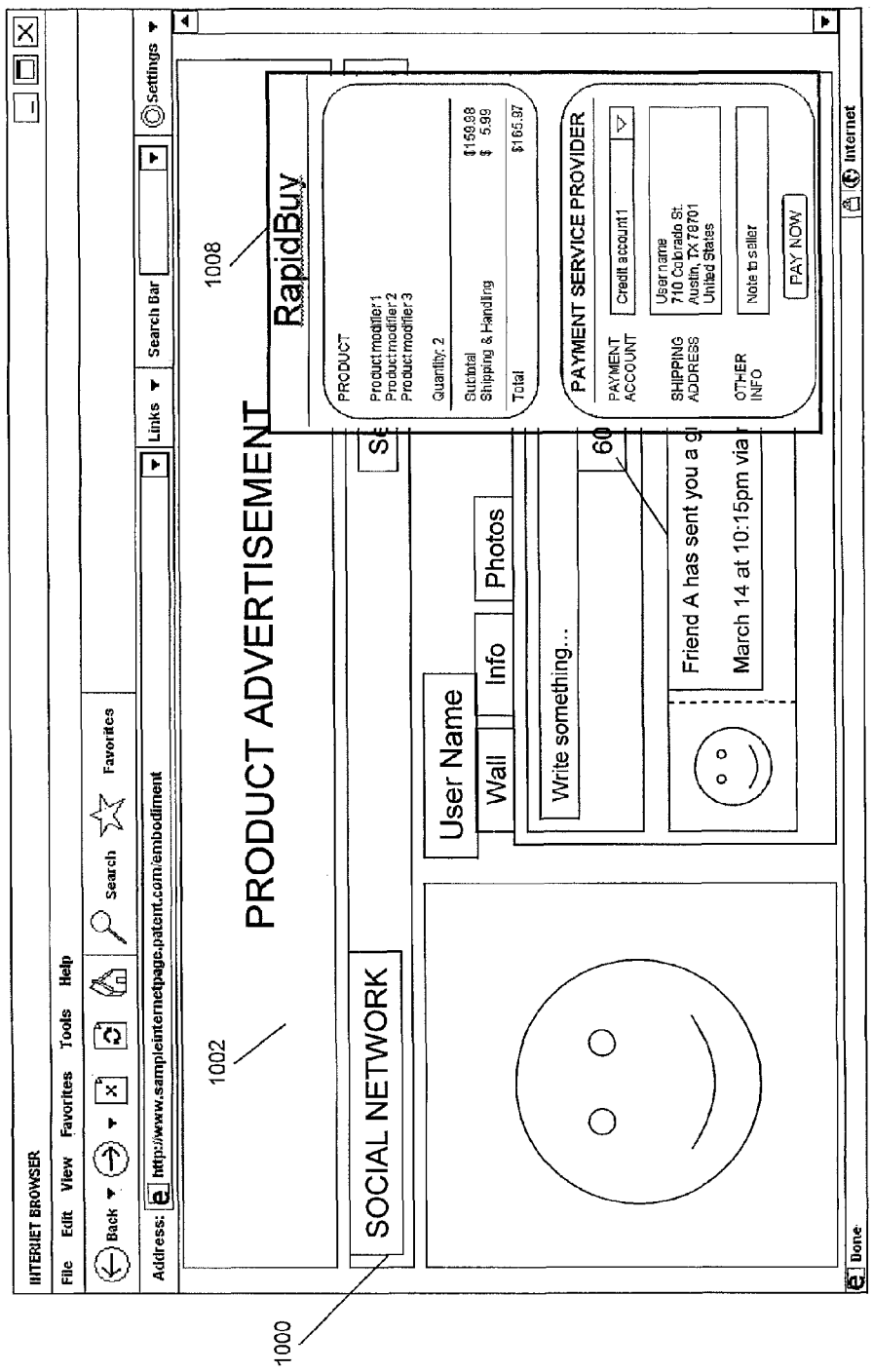
FIG. 10c is a screenshot illustrating an embodiment of a second payment page provided in response to submitting payer account credentials on the first payment page of FIG. 10b.
Figure 10D:
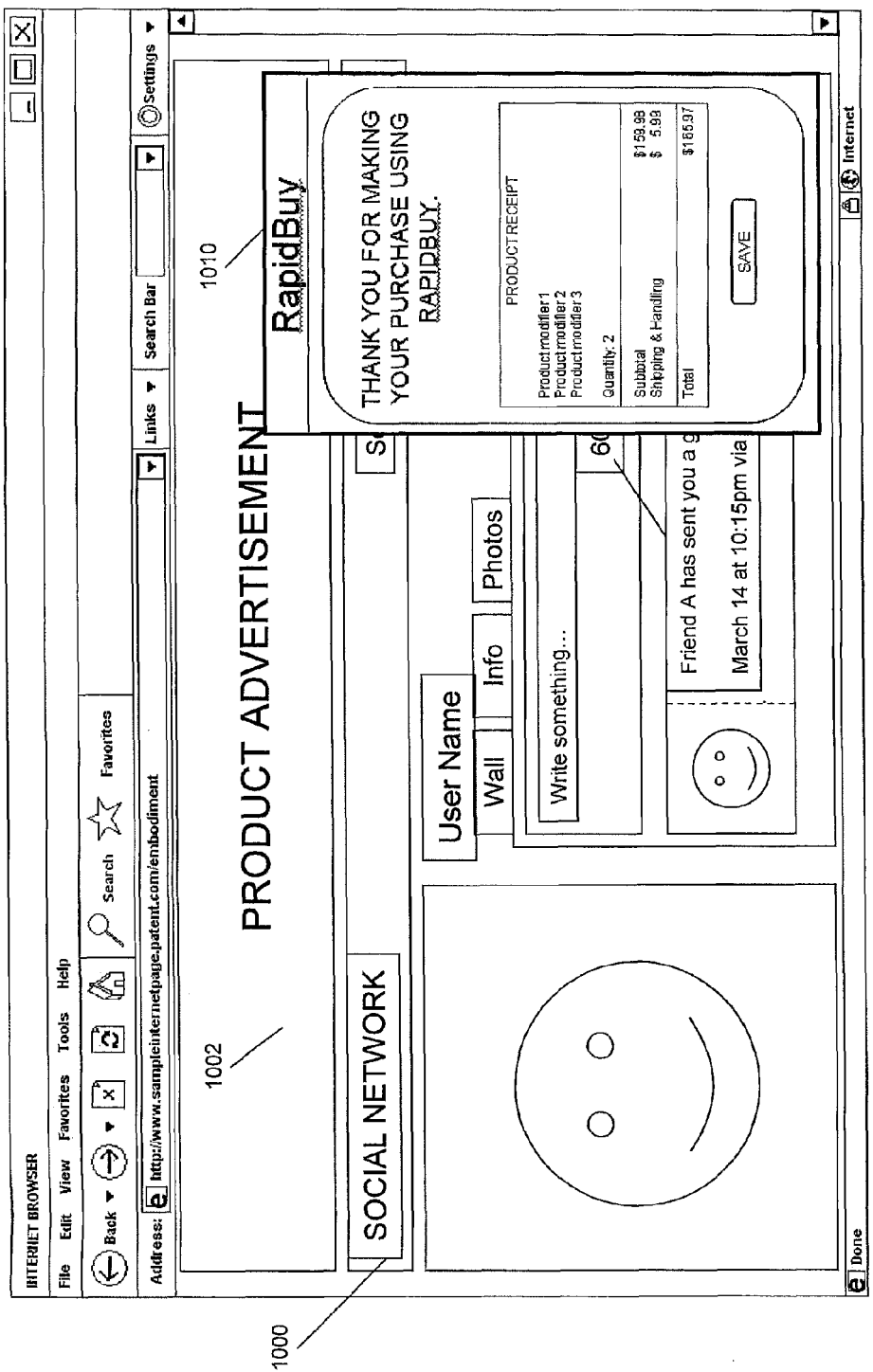
FIG. 10d is a screenshot illustrating an embodiment of a receipt page provided in response to selecting a payment confirmation indicator on the second payment page of FIG. 10c.

When operating according to the method 100, the online payment system illustrated in FIGS. 10a, 10b, 10c, and 10d may combine blocks 104 and 106 such that when the payment tag 1004 is selected by the user (e.g., by 'clicking' on the product tag 1004), a payment application is started and payment tag information associated with the product tag 1004 is received. Then method 100 then operates as discussed above such that product information in retrieved at block 108 and a first payment page is provided at block 110. FIG. 10b illustrates a first payment page 1006 that operates in a substantially similar manner as the first payment page 700, discussed above with reference to FIG. 7. The method 100 then continues to blocks 112 and 114 where payer account credentials are received and payer account information is retrieved substantially as described above. The method 100 comes to block 116 where a second payment page is provided. FIG. 10c illustrates a second payment page 1008 that operates in a substantially similar manner as the second payment page 800, discussed above with reference to FIG. 8. The method 100 then continues on to block 118 where a payment confirmation is sent, and a receipt page may be provided. FIG. 10d illustrates a receipt page 1010 that operates in a substantially similar manner as the receipt page 900, discussed above with reference to FIG. 9.

Thus, a online payment system has been described that allows a payer to quickly and easily make payments online. Furthermore, combinations of the embodiments of the online payment systems discussed above are envisioned. For example, an augmented reality system may be implemented in which the payer may view a product, product advertisement, seller establishment, or other viewable entity through their payer device, and the payer device may then display an electronic payment tag similar to that discussed with reference to FIGS. 10a, 10b, 10c, and 10d using augmented reality technology known in the art. In such a system, product tags may be displayed to a payer on the payer device based on a payer location (as determined by a location determination device in the payer device). For example, the payer may be located in the vicinity of a seller, and the seller may provide a product and product tag on the payer device due to their common location. The payer may then use the online payment system as discussed above to quickly and easily purchase the product. In another example, the payer may provide a list of desired products to the payment application, and when the payer device is in a location where one of the products on the list of desired products is available, the payer may be notified and provided a payment tag with which to make the purchase as discussed above.

Figure 11:
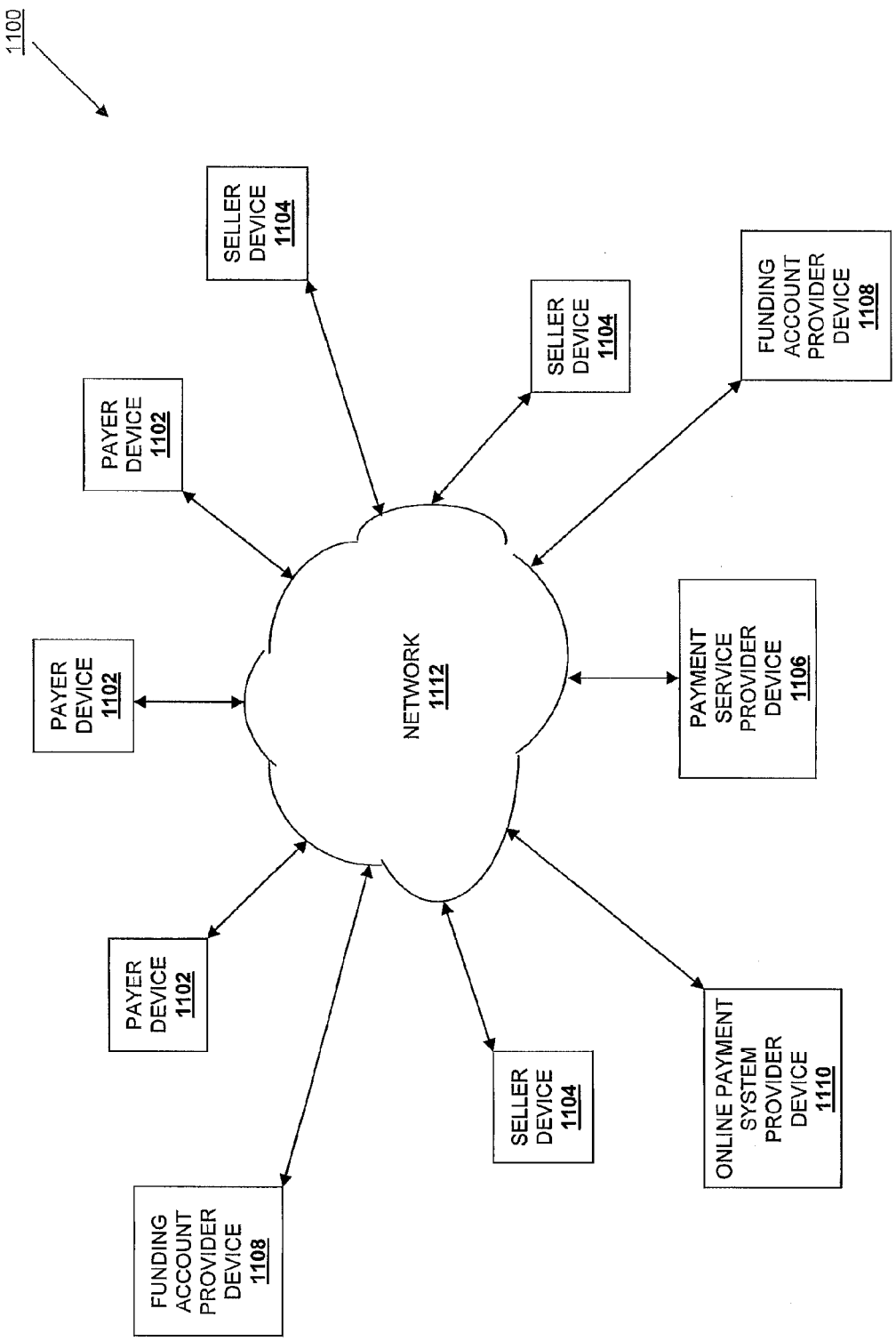
FIG. 11 is a schematic view illustrating an embodiment of a networked system.

Referring now to FIG. 11, an embodiment of a networked system 1100 used in the online system described above is illustrated. The networked system 1100 may include any or all of a plurality of payer devices 1102, a plurality of seller devices 1104, a payment service provider device 1106, a plurality of funding account holder devices 1108, and/or an online system provider device 1110 in communication over a network 1112. Any of the payer devices 1102 may be the payer device 300, discussed above. The seller devices 1104 may be the seller devices operated by the sellers of the products discussed above. The payment service provider device 1106 may be operated by a payment service provider such as, for example, PayPal Inc. of San Jose, Calif., as discussed above. The funding account provider devices 1108 may be funding account provider devices operated by funding account providers such as, for example, credit card account providers, bank account providers, savings account providers, and a variety of other account providers known in the art. The online payment system provider device 1110 may be operated by an online payment system provider as discussed above. One of skill in the art will recognize that some of the devices in the networked system 1100 may not be necessary in different embodiments. For example, where the online payment system is provided by a seller, the online payment system provider device 1110 and the payment service provider device 1106 may not be included in the networked system 1100. In another example, where the online payment system is provided by a payment service provider device, the online payment system provider device 1110 may not be included in the networked system 1100. In another example, where the online payment system is provided by a funding account provider device, the online payment system provider device 1110 and the payment service provider device 1106 may not be included in the networked system 1100. Thus, one of skill in the art will recognize that a variety of modifications may be provided to the networked system 1100 while remaining within the scope of the present disclosure.

The payer devices 1102, seller devices 1104, payment service provider device 1106, funding account provider devices 1108, and/or the online payment service provider device 1110 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1112.

The network 1112 may be implemented as a single network or a combination of multiple networks. For example, in various embodiments, the network 1112 may include the Internet and/or one or more intranets, landline networks, wireless networks, and/or other appropriate types of networks.

The payer devices 1102 may be implemented using any appropriate combination of hardware and/or software configured for wired and/or wireless communication over network 1112. For example, in one embodiment, the payer devices 1102 may be implemented as a personal computer of a user in communication with the Internet. In other embodiments, the payer devices 1102 may be a smart phone, personal digital assistant (PDA), laptop computer, and/or other types of computing devices.

The payer devices 1102 may include one or more browser applications which may be used, for example, to provide a convenient interface to permit the payer to browse information available over the network 1112. For example, in one embodiment, the browser application may be implemented as a web browser configured to view information available over the Internet.

The payer devices 1102 may also include one or more toolbar applications which may be used, for example, to provide user-side processing for performing desired tasks in response to operations selected by the payer. In one embodiment, the toolbar application may display a user interface in connection with the browser application. In another embodiment, the toolbar application may provide the payment application, discussed above.

The payer devices 1102 may further include other applications as may be desired in particular embodiments to provide desired features to the payer devices 1102. In particular, the other applications may include the payment application, discussed above, for payments assisted by a payment service provider through the payment service provider device 1106. The other applications may also include security applications for implementing user-side security features, programmatic user applications for interfacing with appropriate application programming interfaces (APIs) over the network 1112, or other types of applications. Email and/or text applications may also be included, which allow the payer to send and receive emails and/or text messages through the network 1112. The payer devices 1102 include one or more user and/or device identifiers which may be implemented, for example, as operating system registry entries, cookies associated with the browser application, identifiers associated with hardware of the payer devices 1102, or other appropriate identifiers, such as a phone number. In one embodiment, the user identifier may be used by the payment service provider device 1106, funding account provider devices 1108, and/or online payment service provider device 1110 to associate the user with a particular account as further described herein.

The seller devices 1104 may be maintained, for example, by the seller of the product, a conventional or on-line merchant, conventional or digital goods seller, individual seller, and/or application developer offering various products and/or services in exchange for payment to be received conventionally or over the network 1112. In this regard, the seller devices 1104 may include a database identifying available products and/or services (e.g., collectively referred to as products) which may be made available for viewing and purchase by the payer. In addition, databases identifying available products and/or services (e.g., collectively referred to as products) will be available to any provider of the online payment system, as discussed above.

Figure 12:
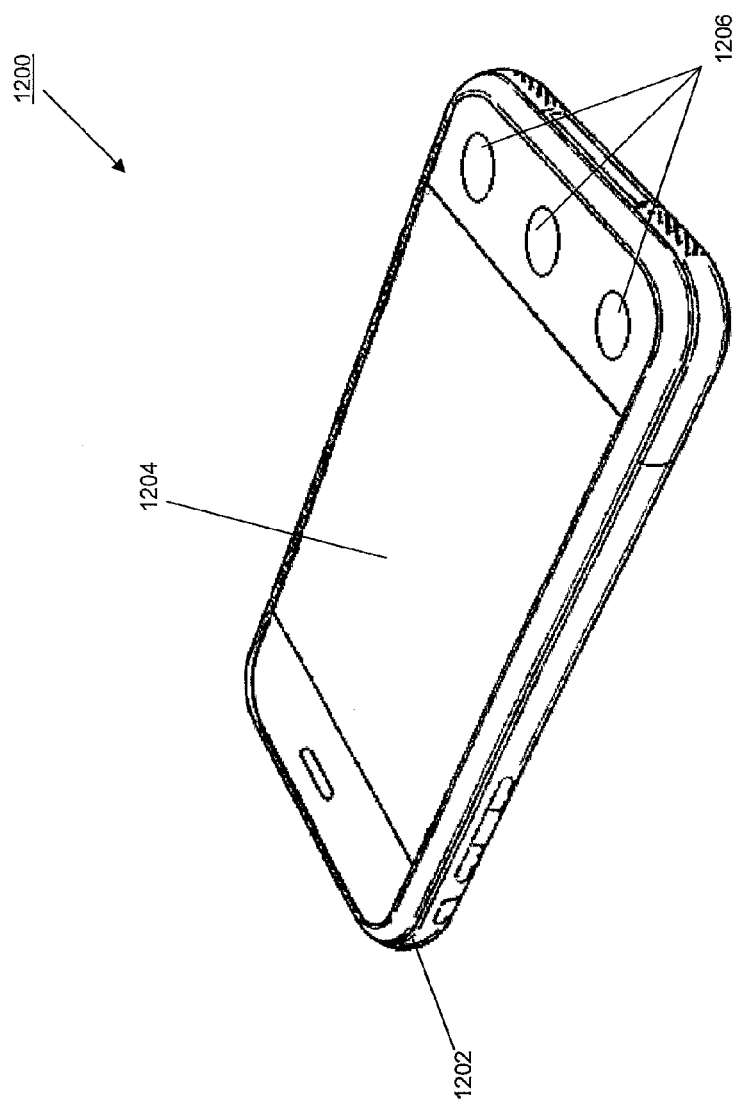
FIG. 12 is a perspective view illustrating an embodiment of a payer device.

Referring now to FIG. 12, an embodiment of a payer device 1200 is illustrated. The payer device 1200 may be the payer devices 300 and/or 1102. The payer device 1200 includes a chassis 1202 having a display 1204 and an input device including the display 1204 and a plurality of input buttons 1206. One of skill in the art will recognize that the payer device 1200 is a portable or mobile phone including a touch screen input device and a plurality of input buttons that allow the functionality discussed above with reference to the method 100. However, a variety of other portable/mobile payer devices may be used in the method 100 without departing from the scope of the present disclosure.

Figure 13:
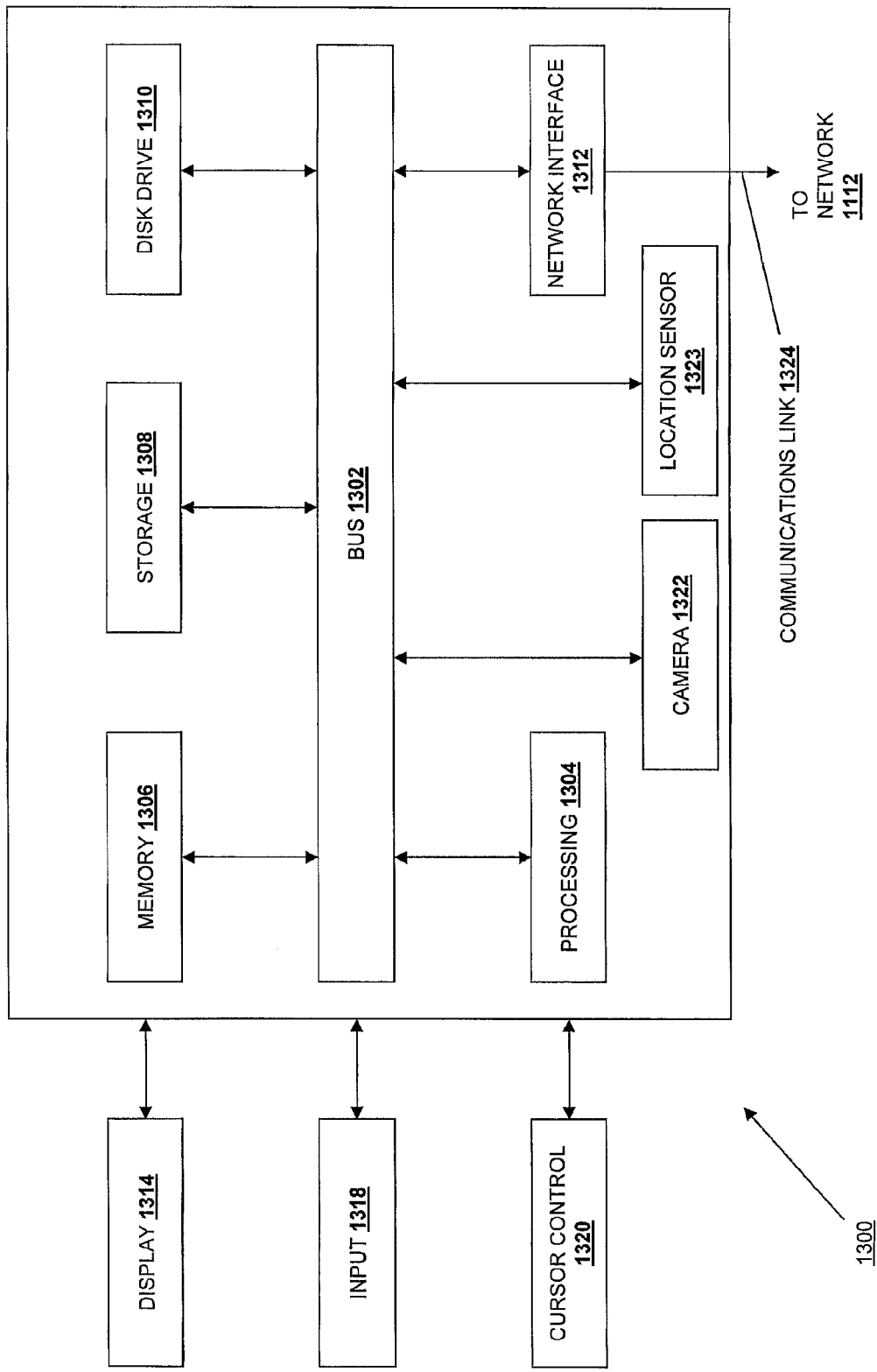
FIG. 13 is a schematic view illustrating an embodiment of a computer system.

Referring now to FIG. 13, an embodiment of a computer system 1300 suitable for implementing, for example, the payer device 300, the payer devices 1102, the seller devices 1104, the payment service provider device 1106, the funding account provider devices 1108, and/or the online payment service provider device 1110 is illustrated. It should be appreciated that other devices utilized by payers, sellers, payment service providers, funding account providers, and/or online payment service providers in the payment system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a camera component 1322, and/or a location determination device 1323 (e.g., a Global Positioning System (GPS) device as illustrated, a cell tower triangulation device, and/or a variety of other location determination devices known in the art.) In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the payer devices 300, 1102, and 1200, the seller devices 1104, the payment service provider device 1106, the funding account provider devices 1108, and/or the online payment service provider device 1110. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1112 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
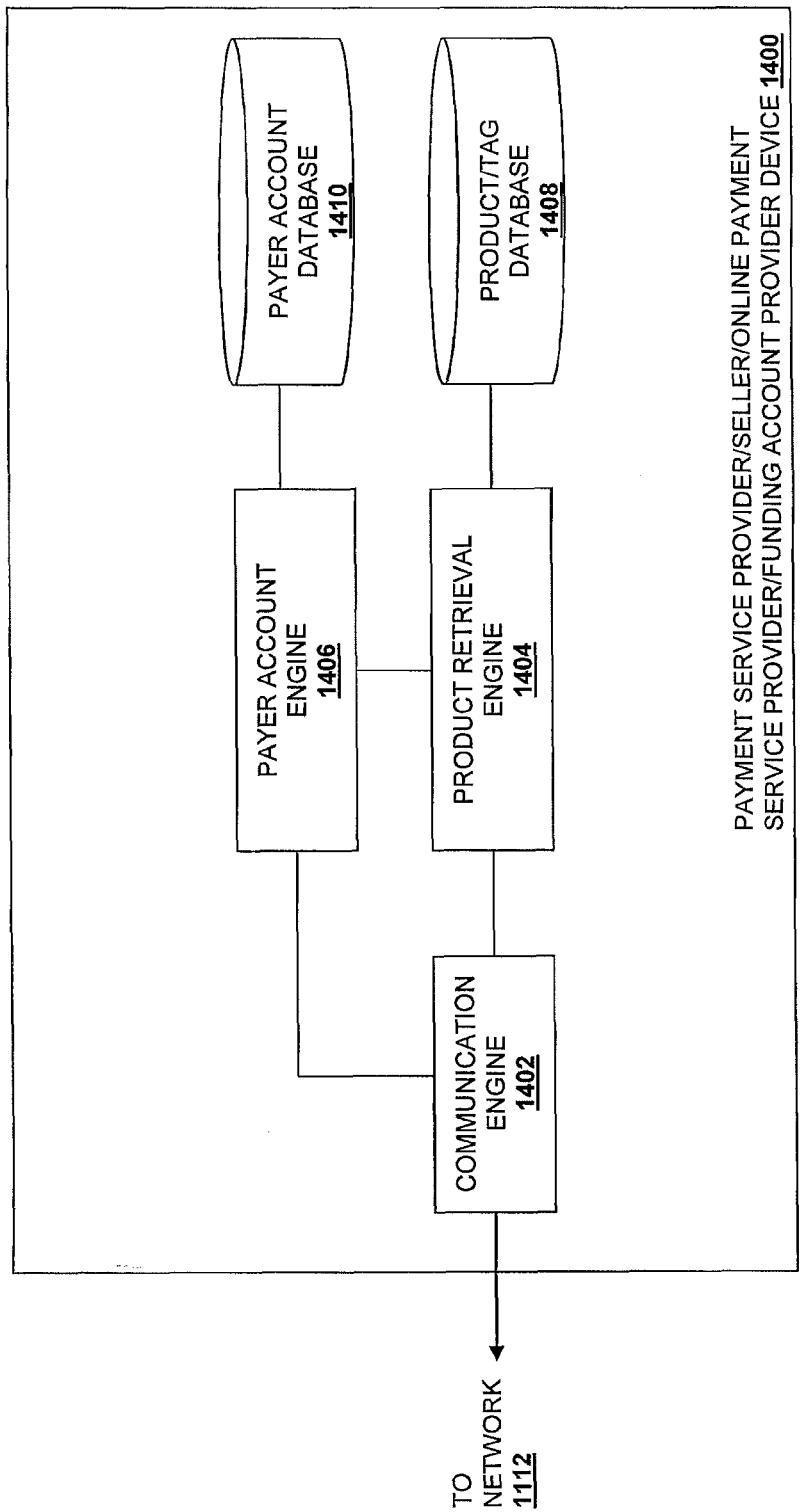
FIG. 14 is a schematic view illustrating an embodiment of a seller device, a payment service provider device, a funding account provider device, an online payment service provider device, and/or combinations thereof.

Referring now to FIG. 14, an embodiment of a payment service provider/seller/online payment service provider/funding account provider device 1400 is illustrated (i.e., the device 1400 may be any or combinations of the payment service provider device, the seller device, the online payment service provider device, and/or the funding account provider device, depending on the embodiment and which entity or entities are providing the online payment system). The device 1400 includes a communication engine 1402 that is coupled to the network 1112, a product retrieval engine 1404, and a payer account engine 1406. The product retrieval engine 1404 is coupled to the payer account engine 1406 and a product/tag database 1408, and the payer account engine 1406 is coupled to the product retrieval engine 1404 and a payer account database 1410. The communication engine 1402 may be software or instructions stored on a computer-readable medium that allows the device(s) 1400 to send and receive information over the network 1112. The product retrieval engine 1404 may be software or instructions stored on a computer-readable medium that is operable to receive payment tag information, retrieve product information from the product/tag database 1406, and provide the product information to the communication engine 1402 (e.g., for transmittal to the payer device) and/or the payer account engine 1406. The payer account engine 1406 may be software or instructions stored on a computer-readable medium that is operable to receive payer account credentials, retrieve payer account information from the payer account database 1410, receive product information from the product retrieval engine 1404, receive purchasing details from the communication engine, and provide payer account to the communication engine 1402 (e.g., for transmittal to the payer device). While the engines 1402, 1404, and 1406 and the databases 1408 and 1410 have been illustrated as located in the device 1400, one of skill in the art will recognize that they may be connected to one another through the network 1112 (e.g., when the online payment system is provided by more than one entity such as, for example, when the payer account engine is provided by a funding account provider and the product retrieval engine is provided by a seller) without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on sellers and payers; however, a payer or consumer can pay, or otherwise interact with any type of recipient, including charities and individuals. The payment does not have to involve a purchase, but may be a loan, a charitable contribution, a gift, etc. Thus, seller as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for online payments, comprising:
receiving, by a payer device, an instruction to start a payment application;
receiving, by the payer device, payment tag information that is captured from a product advertisement for a product and that is associated with that product;
sending, by the paver device, the payment tag information over a network;
receiving, by the payer device over the network, product information that is specific to the product that is associated with the payment tag information and, in response, displaying a first payment page on the payer device through the payment application, wherein the first payment page includes:
the product information that is specific to the product;
at least one non-quantity product modifier input that provides for the modification of a detail of the product other than a quantity of the product; and
a request for payer account credentials, wherein the first payment page is displayed on the payment device through the payment application immediately following the sending of the payment tag information over the network;
receiving, by the payer device through the first payment page payment, at least one non-quantity product modifier for the product through the at least one non-quantity product modifier input, and payer account credentials and, in response, sending the at least one non-quantity product modifier and the payer account credentials over the network;
receiving, by the payer device over the network, payer account information and, in response, displaying a second payment page on the payer device through the payment application, wherein the second payment page includes the payer account information and a payment confirmation indicator, and wherein the second payment page is displayed on the payer device through the payment application immediately following the first payment page; and
receiving, by the payer device through the second payment page, a selection of the payment confirmation indicator and, in response, sending a payment confirmation over the network.

2. The method of claim 1, further comprising:
in response to receiving the instruction to start the payment application, displaying a payment tag information provision page on the payer device through the payment application, wherein the payment tag information that is captured from the product advertisement for the product and associated with that product is received by the payer device through the payment tag information provision page, and wherein the first payment page is displayed on the payment device through the payment application immediately following the payment tag information provision page.

3. The method of claim 2, wherein the receiving the payment tag information that is captured from the product advertisement for the product and that is associated with that product includes capturing an image that includes the payment tag information displayed on the product advertisement.

4. The method of claim 1, wherein the sending the payment tag information over the network is performed automatically in response to receiving the payment tag information.

5. The method of claim 1, wherein the product includes clothing and the at least one non-quantity product modifier is at least one of a clothing size and a clothing color.

6. The method of claim 1, wherein the: second payment page includes a fundinq account selector and the method further comprises:
receiving, by the payer device through the second payment page, a selection of a first funding account from a plurality of funding accounts through the funding account selector and, in response, using the first funding account to fund a payment associated with the payment confirmation.

7. The method of claim 1, wherein the second payment page includes the product information that is specific to the product and the at least one non-quantity product modifier for the product.

8. The method of claim 1, wherein product information that is associated with the payment tag information includes seller information, and wherein the seller information is included on the first payment page.

9. A non-transitory machine-readable medium comprising a plurality of machine-readable instructions which, when executed by one or more processors, are adapted to cause the one or more processors to perform a method comprising:
receiving, by a payer device, an instruction to start a payment application;
receiving, by the payer device, payment tag information that is captured from a product advertisement for a product and that is associated with that product;
sending, by the paver device, the payment tag information over a network;
receiving, by the payer device over the network, product information that is specific to the product that is associated with the payment tag information and, in response, displaying a first payment page on the payer device through the payment application, wherein the first payment page includes:
the product information that is specific to the product
at least one non-quantity product modifier input that provides for the modification of a detail of the product other than a quantity of the product; and
a request for payer account credentials, wherein the first payment page is displayed on the payment device through the payment application immediately following the sending of the payment tag information over the network;
receiving, by the payer device through the first payment page payment, at least one non-quantity product modifier for the product through the at least one non-quantity product modifier input, and payer account credentials and, in response, sending the at least one non-quantity product modifier and the payer account credentials over the network;
receiving, by the payer device over the network, payer account information and, in response, displaying a second payment page on the payer device through the payment application, wherein the second payment page includes the payer account information and a payment confirmation indicator, and wherein the second payment page is displayed on the payer device through the payment application immediately following the first payment page; and
receiving, by the payer device through the second payment page, a selection of the payment confirmation indicator and, in response, sending a payment confirmation over the network.

10. The non-transitory machine-readable medium of claim 9, wherein the method further comprises:
in response to receiving the instruction to start the payment application, displaying a payment tag information provision page on the payer device through the payment application, wherein the payment tag information that is captured from the product advertisement for the product and associated with that product is received by the payer device through the payment tag information provision page, and wherein the first payment page is displayed on the payment device through the payment application immediately following the payment tag information provision page.

11. The non-transitory machine-readable medium of claim 10, wherein the receiving the payment tag information that is captured from the product advertisement for the product and that is associated with that product includes capturing an image that includes the payment tag information displayed on the product advertisement.

12. The non-transitory machine-readable medium of claim 9, wherein the sending the payment tag information over the network is performed automatically in response to receiving the payment tag information.

13. The non-transitory machine-readable medium of claim 9, wherein the product includes clothing and the at least one non-quantity product modifier is at least one of a clothing size and a clothing color.

14. The non-transitory machine-readable medium of claim 9, wherein the second payment page includes a funding account selector and the method further comprises:
receiving, by the payer device through the second payment page, a selection of a first funding account from a plurality of funding accounts through the funding account selector and, in response, using the first funding account to fund a payment associated with the payment confirmation.

15. The non-transitory machine-readable medium of claim 14, wherein the second payment page includes the product information that is specific to the product and the at least one non-quantity product modifier for the product.

16. The non-transitory machine-readable medium of claim 9, wherein product information that is associated with the payment tag information includes seller information, and wherein the seller information is included on the first payment page.

17. A online payment system, comprising:
means for receiving an instruction to start a payment application;
means for receiving payment tag information that is captured from a product advertisement for a product and that is associated with that product;
means for sending the payment tag information over a network;
means for receiving, over the network, product information that is specific to the product that is associated with the payment tag information and, in response, providing a first payment page through the payment application, wherein the first payment page includes:
the product information that is specific to the product
means for providing at least one non-quantity product modifier that provides for the modification of a detail of the product other than a quantity of the product; and
a request for payer account credentials, wherein the first payment page is provided through the payment application immediately following the sending of the payment tag information over the network;
means for receiving, through the first payment page, at least one non-quantity product modifier for the product through the means for providing the at least one non-quantity product modifier input, and payer account credentials and, in response, sending the at least one non-quantity product modifier and the payer account credentials over the network;
means for receiving, over the network, payer account information and, in response, providing a second payment page through the payment application, wherein the second payment page includes the payer account information and a payment confirmation indicator, and wherein the second payment page is provided through the payment application immediately following the first payment page; and
means for receiving, through the second payment page, a selection of the payment confirmation indicator and, in response, sending a payment confirmation over the network.

18. The system of claim 17, further comprising:
means for providing, in response to receiving the instruction to start the payment application, a payment tag information provision page through the payment application, wherein the payment tag information that is captured from the product advertisement for the product and that is associated with that product is received through the payment tag information provision page, and wherein the first payment page is provided through the payment application immediately following the payment tag information provision page.

19. The system of claim 17, further comprising:
means for receiving a selection of a first funding account from a plurality of funding accounts and, in response, using the first funding account to fund a payment associated with the payment confirmation.

20. The system of claim 17, wherein the product includes clothing and the at least one non-quantity product modifier is at least one of a clothing size and a clothing color.

* * * * *